United States Patent
Tan et al.

(10) Patent No.: US 11,138,435 B1
(45) Date of Patent: Oct. 5, 2021

(54) METHODS AND SYSTEMS FOR EVALUATING THE CAPACITY OF A CONTAINER

(71) Applicant: Volvo Car Corporation, Gothenburg (SE)

(72) Inventors: Qinzi Tan, San Jose, CA (US); Garrett Gonzales, Oakland, CA (US); Caitlyn Mowry, Sunnyvale, CA (US)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 16/864,244

(22) Filed: May 1, 2020

(51) Int. Cl.
*G06T 19/00* (2011.01)
*G06K 9/00* (2006.01)
*G06F 3/0481* (2013.01)
*G06T 19/20* (2011.01)
*G06T 7/73* (2017.01)

(52) U.S. Cl.
CPC ..... *G06K 9/00671* (2013.01); *G06F 3/04815* (2013.01); *G06T 7/74* (2017.01); *G06T 19/006* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 10,026,209 B1* | 7/2018 | Dagley | G06T 7/73 |
| 10,287,116 B2 | 5/2019 | Daun et al. | |
| 10,540,821 B2* | 1/2020 | Musunuri | G06K 9/03 |
| 2015/0130592 A1 | 5/2015 | Lakshminarayanan et al. | |
| 2019/0213529 A1* | 7/2019 | Donnelly | G06Q 10/087 |
| 2020/0283245 A1* | 9/2020 | Gualtieri | B65G 65/30 |

FOREIGN PATENT DOCUMENTS

| | | |
|---|---|---|
| GB | 2539030 A | 7/2016 |
| KR | 20170026805 A | 3/2017 |
| KR | 101815583 B1 | 1/2018 |

* cited by examiner

*Primary Examiner* — Nicholas R Wilson
(74) *Attorney, Agent, or Firm* — Clements Bernard Walker; Christopher L. Bernard

(57) ABSTRACT

Empowered by augmented reality (AR) technologies, the present disclosure allows a user to display virtual content in a physical reality and turn an AR-ready handheld mobile device into a dimension measuring tool. The present disclosure allows the user to first display a virtual container asset, with its actual size in physical reality, in any given configuration, and then create a virtual dimensional equivalent of an item-to-be-fit based on dimensional data captured by a 6-degree-of-freedom (6DoF) device or the like. Finally, the user can place the virtual item into the virtual container to evaluate the capacity and fit in the given configuration.

20 Claims, 6 Drawing Sheets

METHODS AND SYSTEMS FOR EVALUATING THE CAPACITY OF A CONTAINER

TECHNICAL FIELD

The present disclosure relates generally to the automotive and augmented reality (AR) fields. More particularly, the present disclosure relates to methods and systems for evaluating the capacity of a container using an AR technology.

BACKGROUND

For certain types of commercial products that offer storage space as one of their major value propositions, such as vehicles, it is often difficult for customers to evaluate their actual space capacity before purchasing them without having both the product and an item-to-be-fit physically in front of them. The same problem exists in the e-commerce and logistics industries, where it is often not a simple thing for a customer to decide which shipping container or packaging box to order without having to perform a complicated measuring and matching process, for example.

In the automotive industry, it is always valuable for a manufacturer to offer information regarding the capacity of vehicle trunks and the like during the customer purchasing and training processes. However, this can be extremely challenging during a digital experience, when a customer is not at a dealership in proximity to a real vehicle.

The above-described background relating to evaluating the capacity of a container is merely intended to provide a contextual overview of some current issues and is not intended to be exhaustive. Other contextual information may become apparent to those of ordinary skill in the art upon review of the following description of exemplary embodiments.

SUMMARY

Empowered by AR technologies, the present disclosure allows a user to display virtual content in a physical reality and turn an AR-ready handheld mobile device into a dimension measuring tool, which effectively addresses the above issues. The present disclosure allows the user to first display a virtual container asset, with its actual size in physical reality, in any given configuration, and then create a virtual dimensional equivalent of an item-to-be-fit based on dimensional data captured by a 6-degree-of-freedom (6DoF) device or the like. Finally, the user can place the virtual item into the virtual container to evaluate the capacity and fit in the given configuration.

In one exemplary embodiment, the present disclosure provides a method, including: via a mobile device, receiving dimensional and orientation data associated with a container and generating an oriented representation of the container in an augmented reality space; via the mobile device, receiving dimensional data associated with an object and generating a representation of the object in the augmented reality space; and, via the mobile device, receiving orientation and position instructions associated with the object from a user and orienting and positioning the object relative to the container accordingly in the augmented reality space thereby enabling the user to assess a fit of the object within the container. The dimensional and orientation data associated with the container is received from a database. Alternatively, the dimensional and orientation data associated with the container is received from a mobile device including one or more of a camera and a sensor device operable for defining a contour of the container. The dimensional data associated with the object is received from a mobile device including one or more of a camera and a sensor device operable for defining a contour of the object. The representation of the container is oriented with respect to a ground plane identified by the user. The representation of the container includes a visualization of the container. Alternatively, the representation of the container includes a virtual representation of the container. The representation of the object includes a virtual representation of the object.

In another exemplary embodiment, the present disclosure provides a non-transitory computer readable medium stored in a memory and executed by a processor to perform the steps, including: receiving dimensional and orientation data associated with a container and generating an oriented representation of the container in an augmented reality space; receiving dimensional data associated with an object and generating a representation of the object in the augmented reality space; and receiving orientation and position instructions associated with the object from a user and orienting and positioning the object relative to the container accordingly in the augmented reality space thereby enabling the user to assess a fit of the object within the container. The dimensional and orientation data associated with the container is received from a database. Alternatively, the dimensional and orientation data associated with the container is received from a mobile device including one or more of a camera and a sensor device operable for defining a contour of the container. The dimensional data associated with the object is received from a mobile device including one or more of a camera and a sensor device operable for defining a contour of the object. The representation of the container is oriented with respect to a ground plane identified by the user. The representation of the container includes a visualization of the container. Alternatively, the representation of the container includes a virtual representation of the container. The representation of the object includes a virtual representation of the object.

In a further exemplary embodiment, the present disclosure provides a system, including: a mobile device including a processor and one or more of a camera and a sensor device; and a mobile application stored in a memory and executed by the processor of the mobile device operable for: receiving dimensional and orientation data associated with a container and generating an oriented representation of the container in an augmented reality space; receiving dimensional data associated with an object and generating a representation of the object in the augmented reality space; and receiving orientation and position instructions associated with the object from a user and orienting and positioning the object relative to the container accordingly in the augmented reality space thereby enabling the user to assess a fit of the object within the container. The dimensional and orientation data associated with the container is received from a database. Alternatively, the dimensional and orientation data associated with the container is received from a mobile device including one or more of a camera and a sensor device operable for defining a contour of the container. The dimensional data associated with the object is received from a mobile device including one or more of a camera and a sensor device operable for defining a contour of the object.

BRIEF DESCRIPTION OF THE DRAWINGS

The present disclosure is illustrated and described herein with reference to the various drawings, in which like refer

FIG. 5 is a block diagram of a server which may be used in the cloud-based system of FIG. 4 or the like; and FIG. 6 is a block diagram of a user device which may be used in the cloud-based system of FIG. 4 or the like.

DESCRIPTION OF EMBODIMENTS

Again, empowered by AR technologies, the present disclosure allows a user to display virtual content in a physical reality and turn an AR-ready handheld mobile device into a dimension measuring tool. The present disclosure allows the user to first display a virtual container asset, with its actual size in physical reality, in any given configuration, and then create a virtual dimensional equivalent of an item-to-be-fit based on dimensional data captured by a 6DoF device or the like. Finally, the user can place the virtual item into the virtual container to evaluate the capacity and fit in the given configuration. The present disclosure utilizes ARKit/AR-Core, AR Foundation/Magic Leap and the like with the 6DoF controller or the like, and three-dimensional (3D) development platforms, such as Unity3D/Unreal.

In general, the container is known and can be provided in AR space. For example, the cargo space of a vehicle, in a selected configuration, is known and can be provided in AR space. Alternatively, the cargo space of the vehicle, in the selected configuration, can be scanned or point selected using the 6DoF device. Similarly, a 3D map of an objects or objects of interest can be created in AR space via scanning or point selection using the 6DoF device, capturing the precise dimensions of the object or objects. Then, in AP space, the object or objects can be manipulated and "placed" in the map of the cargo space, for example. In this manner, the suitability of the vehicle, or other commercial product, can be assessed by the user in terms of capacity and functionality. As an alternative, "dummy" objects can be provided in AR space to demonstrate this suitability to the user.

The 6DoF controller may include a mobile phone, a mobile device, a tablet or any other suitable device, as will be readily apparent to those of ordinary skill in the art. This 6DoF controller need only be suitable for capturing and measuring the object and displaying it in AR space, as well as the container to be test fit. Further, the 6DoF controller may be suitable for capturing and measuring the container itself and displaying it in AR space, although, in the case of a vehicle, for example, this data may be available in advance in a variety of selectable configurations. With regard to a vehicle, data may be available for "seats-up" and "seats-down" configurations, etc.

Figure 1:
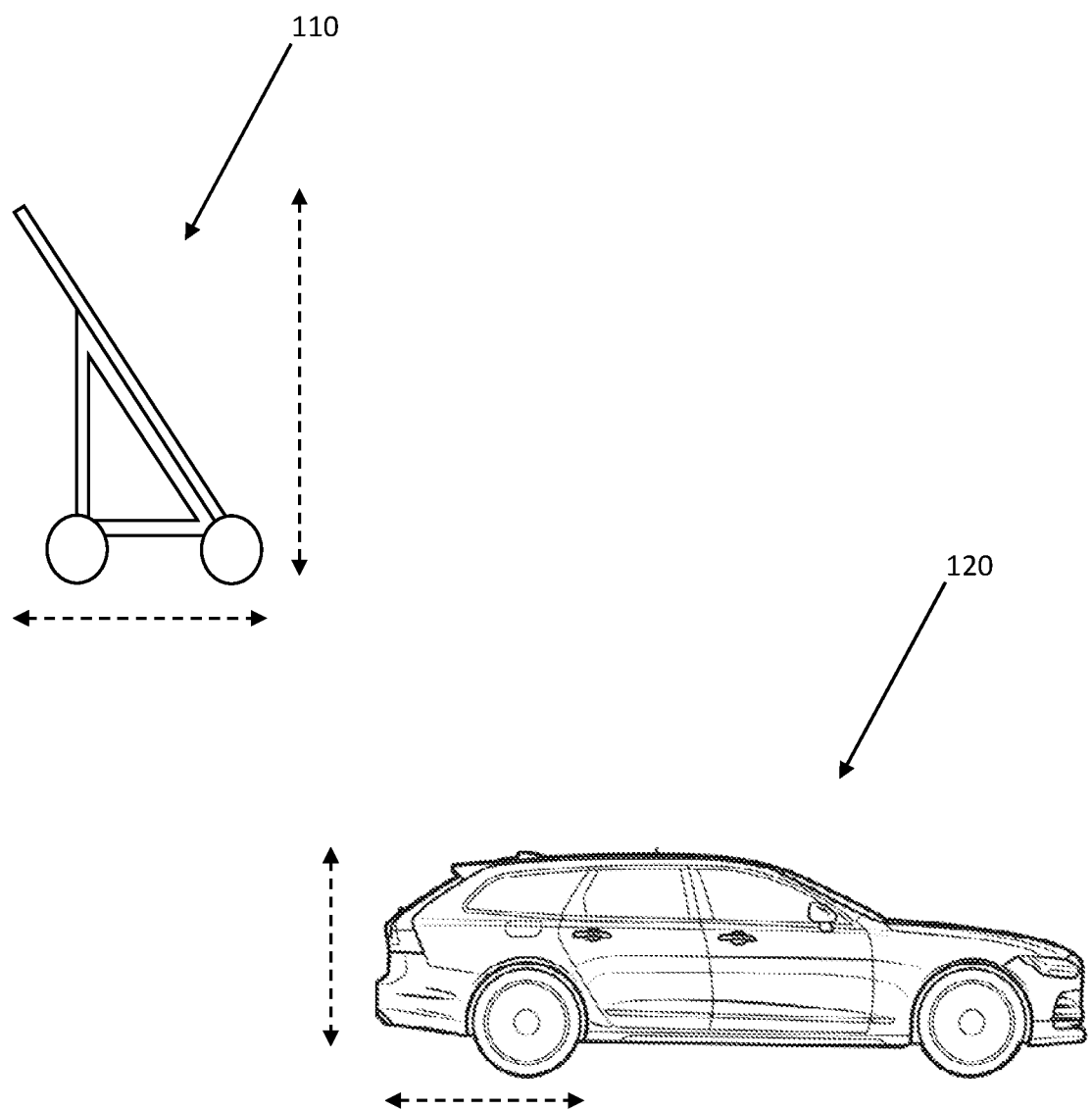
- FIG. 1 is a schematic diagram illustrating one aspect of the method of the present disclosure, highlighting the dimensioning of an object and a container in AR space.

Referring now specifically to FIG. 1, the present disclosure first utilizes the 6DoF controller to capture and dimension an object 110 that is to be placed in a container in AR space. The object 110 may be captured and dimensioned by scanning contours of the object 110 or selecting points associated with edges of the object 110 with the camera or other sensing device of the 6DoF controller. Here, the object 110 could be a baby stroller (as illustrated), a lawn mower, a piece of furniture, a box, a person, or any other object, without limitation. Alternatively, a "canned" object 110 may be provided in AR space with pre-populated dimensions that are ready to go for manipulation and placement. Similarly, the container 120 may be captured and dimensioned by scanning contours of the container 120 or selecting points associated with edges of the container 120 with the camera of the 6DoF controller. Here, the container 120 could be the cargo space of a vehicle in a selected configuration (as illustrated), the seat of a vehicle, a shipping container, a packaging box, or any other container, without limitation. Alternatively, and in the most common embodiment, a "canned" container 120 may be provided in AR space with pre-populated dimensions that are ready to go for manipulation and placement. It should be noted that multiple objects 110 may be captured and dimensioned or otherwise provided for manipulation and placement in a common container 120. These objects 110 may be nested against and/or within one another as their configuration(s) allow. Further, irregularities in the container 120 may be accounted for. In this sense, the AR fitting tool of the present disclosure is robust.

Figure 2:
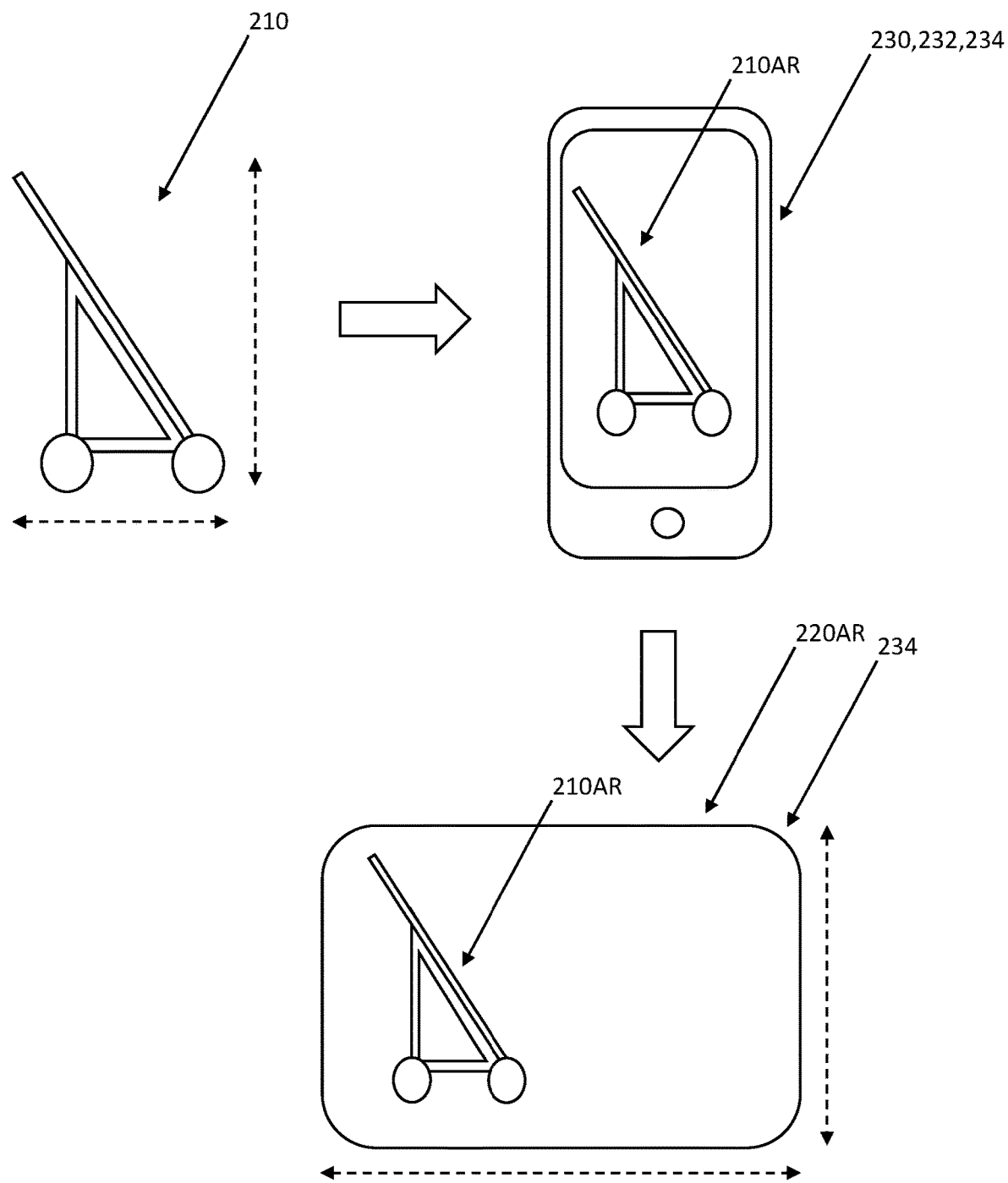
FIG. 2 is a schematic diagram illustrating another aspect of the method and system of the present disclosure, highlighting the capturing and dimensioning of an object in AR space and the subsequent positioning of the captured and dimensioned object in an AR container.

Referring now specifically to FIG. 2, once the object 210 is captured and dimensioned using the camera or other sensor device 232 of the 6DoF controller 230, the object may be displayed and manipulated on the display 234 of the device 230 as an AR object 210AR. Subsequently, the AR object 234 may be "placed" and manipulated in the AR container 220AR. Thus, the "fit" of the AR object 210AR within the AR container 220AR can be assessed in various alignments and configurations. Again, in the most common embodiment, a "canned" AR container 220AR may be provided in AR space with pre-populated dimensions that are ready to go for manipulation and placement. It should further be noted that multiple objects 210 may be captured and dimensioned or otherwise provided for manipulation and placement in a common container 220AR. These objects 210AR may be nested against and/or within one another as their configuration(s) allow. Further, irregularities in the container 220AR may be accounted for.

Figure 3:
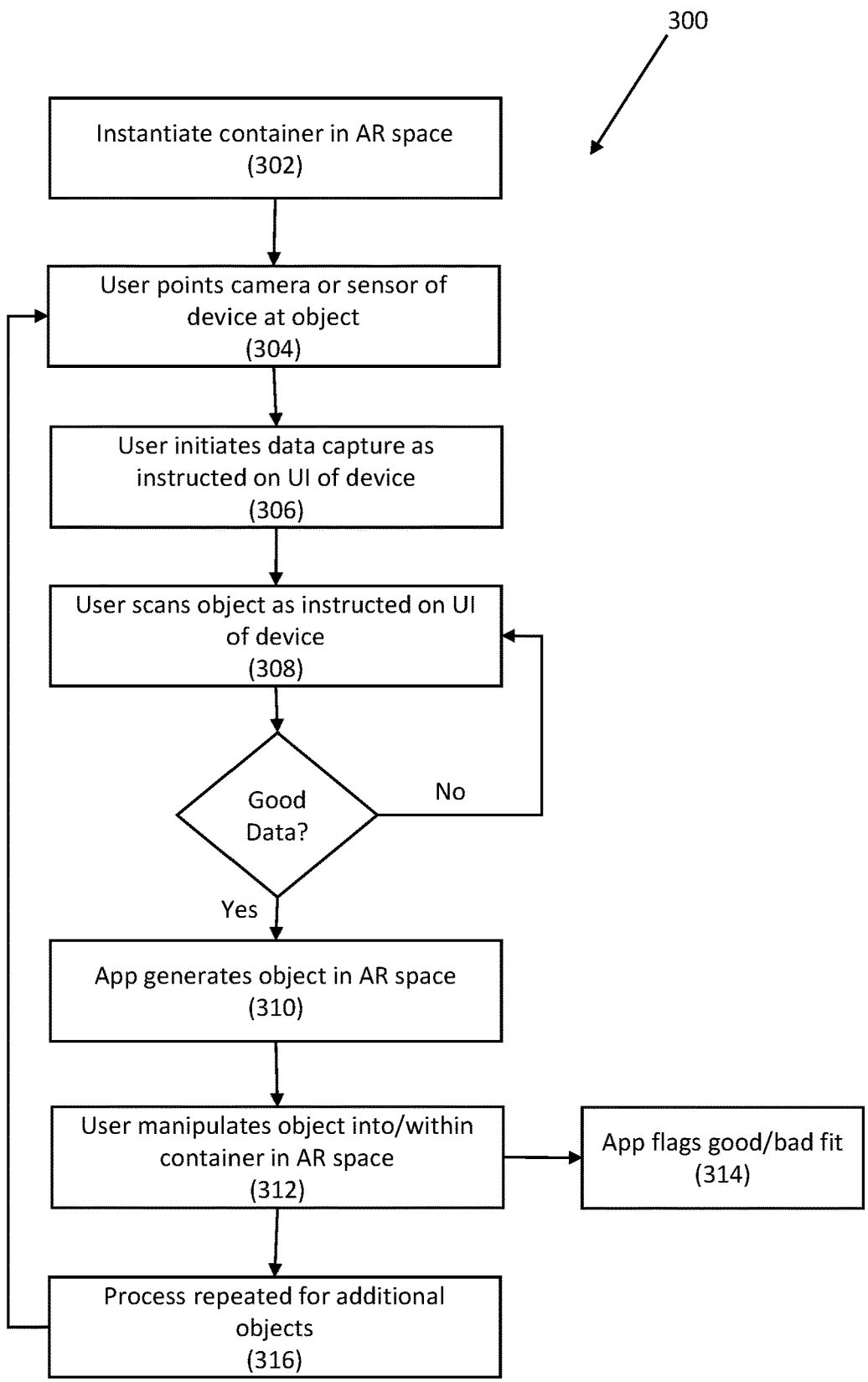
FIG. 3 is a flowchart illustrating one exemplary embodiment of the container space evaluation method of the present disclosure.

Referring now specifically to FIG. 3, in one exemplary embodiment, the container space evaluation method 300 of the present disclosure includes first instantiating the container in AR space 302, which could include capturing and dimensioning the container using the camera or other sensor of the device or simply importing existing data related to the container to the application (app), which could be configuration specific based on a user selection via a user interface (UI) of the device. Subsequently, the user points the camera or sensor of the device at an object to be captured and dimensioned 304. Again, an alternative here is to import existing data related to a "canned" object to the app. Then, the user initiates data capture by the device and the app as instructed on the UI of the device 306. Here, data capture and dimensioning may utilize the scanning of edges of the object or the location of points of the object, although alternative methodologies are certainly also contemplated herein 308. Subsequently, if good data is not obtained, the capture and dimensioning process is repeated. If good data is obtained, the app generates a representation of the object in AR space 310 and the user is able to manipulate and "place" the object within the container in AR space 312, checking the fit of the object within the container using the app. The app may further be configured to flag good/bad fit 314. Finally, this process may be repeated for additional objects and/or other container configurations 316. It should be noted that, as used herein, "application," "app," "mobile application," and "mobile app" all refer generically to a device-executed experience, which may be provided using a traditional downloadable software application on the device or web-based means, with the software application resident on a remote server or in the "cloud."

In generic terms, in building the app of the present disclosure, a virtual coordinate system is correlated to a physical space by adding AR camera GameObjects to game engines such that the app can track both translation and rotation information of the device in space and provide pose data back to the app via the AR camera GameObjects. It should be noted that the AR objects may be manipulated within an AR container or a visualization of the physical container itself, as desired. For mobile devices, immediately when an ARKit/ARCore/AR Foundation app runs on a supported device, a virtual coordinate system correlated to the physical space is created with the initial recognized pose with the device's camera considered as the origin. For immersive headsets with 6DoF controller support, most manufacturers provide controller tracking functionality out of the box.

Text and/or audio instruction is provided in the app to guide the user through the process. By way of example, once the app starts, the user is asked to look down at the ground to find a plane to place the virtual 1:1 sized container or vehicle. Once the plane is recognized, the user is asked to place and rotate the container or vehicle to an ideal position using the UI. For example, the trunk lid of the vehicle may be open, etc. The user is then asked to point the camera at the object to be fit in. Instructions are provided to let the user know that they must capture the width, height, and depth of the object independently. For each side, the user should start at one end and finish at an apposed end. Once the user interacts with a specific UI component on their screen to indicate that the camera is currently positioned at one end of a side (width/height/depth), the user is ready to record. Once the "record" button is tapped, the user moves the camera along the target side, stop at the end, and tap a "finish" button to inform the app accordingly. During this time, real time visualization of the camera movement path should be provided. If the user is not satisfied with the current capture data, as assessed via the real time visualization, the app should provide a UI element to delete the current data and restart the measurement process. Otherwise, the process is repeated for another side of the object, until all width/height/depth data is captured.

The app generates a virtual 1:1 representation in AR space and notifies the user that it can be "placed" and rotated inside the container to then evaluate the container's capacity and functionality. The app provides a UI component that enables the user to capture more objects to the scene. All generated representations, which may be box representations, have proper colliders set up and are thus able to collide with one another according to real life physics principles.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
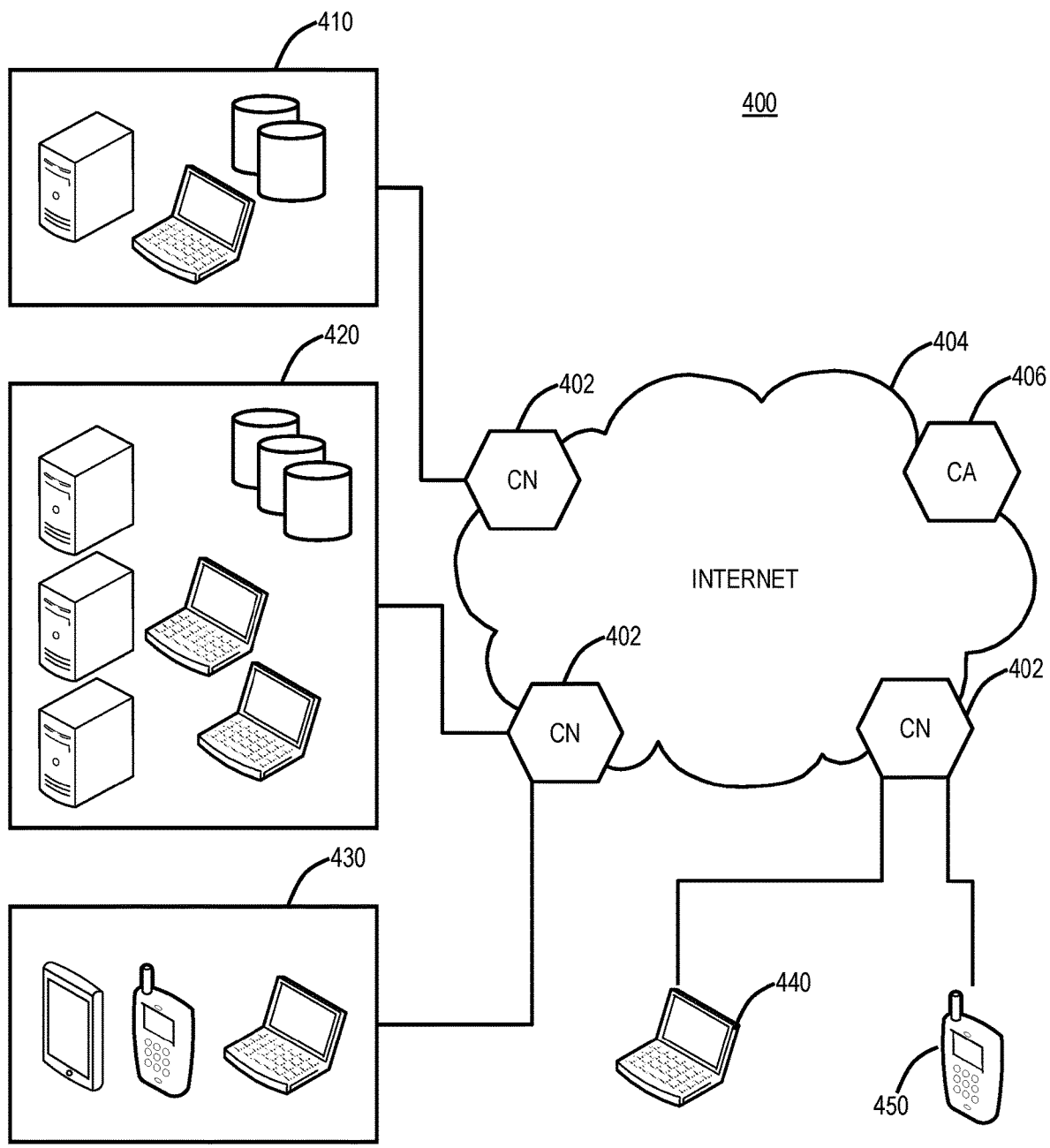
FIG. 4 is a network diagram of a cloud-based system for implementing various cloud-based services.
Figure 5:
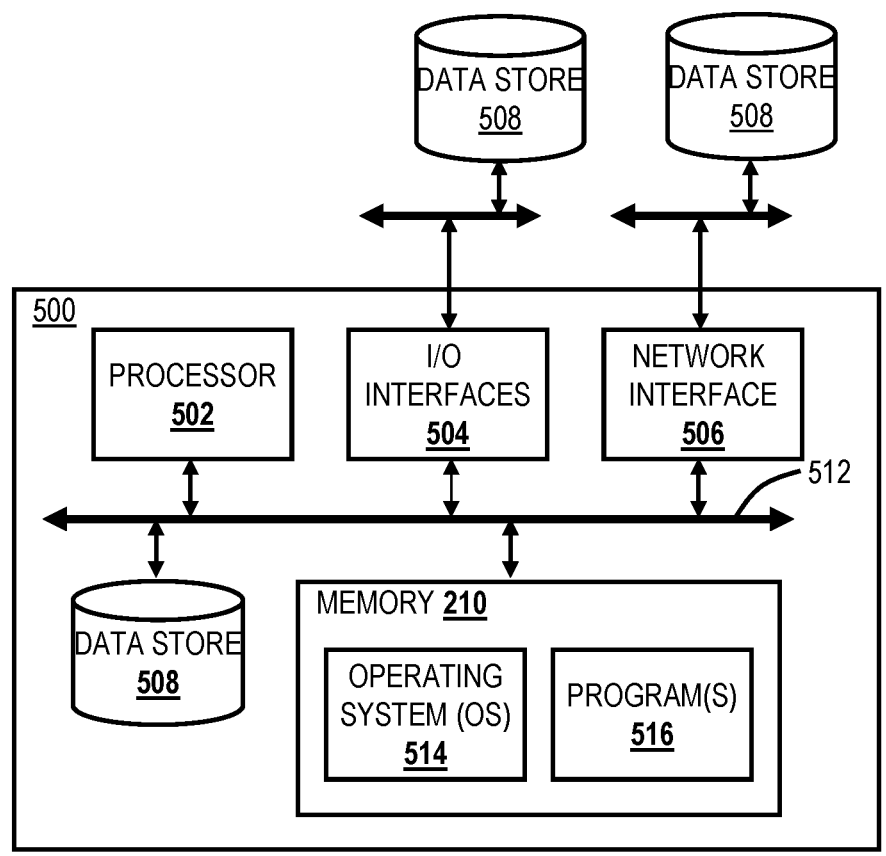

FIG. 4 is a network diagram of a cloud-based system 400 for implementing various cloud-based services. The cloud-based system 400 includes one or more cloud nodes (CNs) 402 communicatively coupled to the Internet 404 or the like. The cloud nodes 402 may be implemented as a server 500 (as illustrated in FIG. 5) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 5 is a block diagram of a server 500, which may be used in the cloud-based system 400 (FIG. 4), in other systems, or standalone. For example, the CNs 402 (FIG. 4) and the central authority nodes 406 (FIG. 4) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 4). The network interface 506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
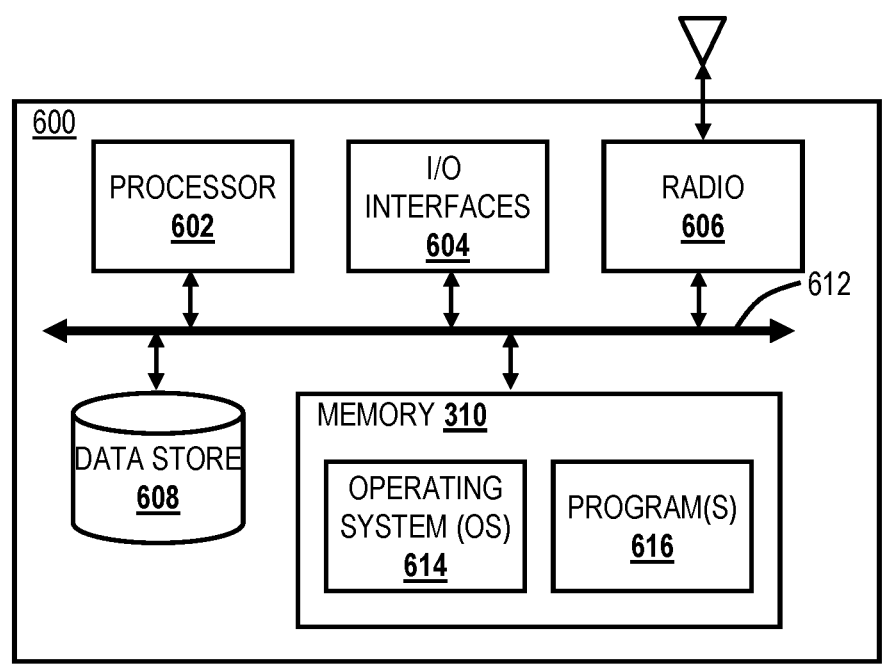

FIG. 6 is a block diagram of a user device 600, which may be used in the cloud-based system 400 (FIG. 4) or the like. Again, the user device 600 can be a smartphone, a tablet, a smartwatch, an Internet of Things (IoT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 6 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 6, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network such as the cloud-based system 400 (FIG. 4).

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
via a mobile device, receiving dimensional and orientation data associated with a container and generating an oriented representation of the container in an augmented reality space;
via the mobile device, receiving dimensional data associated with an object and generating a representation of the object in the augmented reality space; and
via the mobile device, receiving orientation and position instructions associated with the representation of the object in the augmented reality space from a user and orienting and positioning the representation of the object relative to the oriented representation of the container accordingly in the augmented reality space thereby enabling the user to assess a fit of the object within the container, wherein an orientation and position of the representation of the object is freely manipulable within the oriented representation of the container in the augmented reality space.

2. The method of claim 1, wherein the dimensional and orientation data associated with the container is received from a database.

3. The method of claim 1, wherein the dimensional and orientation data associated with the container is received from a mobile device comprising one or more of a camera and a sensor device operable for defining a contour of the container.

4. The method of claim 1, wherein the dimensional data associated with the object is received from a mobile device comprising one or more of a camera and a sensor device operable for defining a contour of the object.

5. The method of claim 1, wherein the representation of the container is oriented with respect to a ground plane identified by the user.

6. The method of claim 1, wherein the representation of the container comprises a visualization of the container.

7. The method of claim 1, wherein the representation of the container comprises a virtual representation of the container.

8. The method of claim 1, wherein the representation of the object comprises a virtual representation of the object.

9. A non-transitory computer readable medium stored in a memory and executed by a processor to perform the steps, comprising:
receiving dimensional and orientation data associated with a container and generating an oriented representation of the container in an augmented reality space;
receiving dimensional data associated with an object and generating a representation of the object in the augmented reality space; and
receiving orientation and position instructions associated with the representation of the object in the augmented reality space from a user and orienting and positioning the representation of the object relative to the oriented representation of the container accordingly in the augmented reality space thereby enabling the user to assess a fit of the object within the container, wherein an orientation and position of the representation of the object is freely manipulable within the oriented representation of the container in the augmented reality space.

10. The non-transitory computer readable medium of claim 9, wherein the dimensional and orientation data associated with the container is received from a database.

11. The non-transitory computer readable medium of claim 9, wherein the dimensional and orientation data associated with the container is received from a mobile device comprising one or more of a camera and a sensor device operable for defining a contour of the container.

12. The non-transitory computer readable medium of claim 9, wherein the dimensional data associated with the object is received from a mobile device comprising one or more of a camera and a sensor device operable for defining a contour of the object.

13. The non-transitory computer readable medium of claim 9, wherein the representation of the container is oriented with respect to a ground plane identified by the user.

14. The non-transitory computer readable medium of claim 9, wherein the representation of the container comprises a visualization of the container.

15. The non-transitory computer readable medium of claim 9, wherein the representation of the container comprises a virtual representation of the container.

16. The non-transitory computer readable medium of claim 9, wherein the representation of the object comprises a virtual representation of the object.

17. A system, comprising:
a mobile device comprising a processor and one or more of a camera and a sensor device; and
a mobile application stored in a memory and executed by the processor of the mobile device operable for:
receiving dimensional and orientation data associated with a container and generating an oriented representation of the container in an augmented reality space;
receiving dimensional data associated with an object and generating a representation of the object in the augmented reality space; and
receiving orientation and position instructions associated with the representation of the object in the augmented reality space from a user and orienting and positioning the representation of the object relative to the oriented representation of the container accordingly in the augmented reality space thereby enabling the user to assess a fit of the object within the container, wherein an orientation and position of the representation of the object is freely manipulable within the oriented representation of the container in the augmented reality space.

18. The system of claim 17, wherein the dimensional and orientation data associated with the container is received from a database.

19. The system of claim 17, wherein the dimensional and orientation data associated with the container is received from a mobile device comprising one or more of a camera and a sensor device operable for defining a contour of the container.

20. The system of claim 17, wherein the dimensional data associated with the object is received from a mobile device comprising one or more of a camera and a sensor device operable for defining a contour of the object.

* * * * *